United States Patent
Cruise et al.

(10) Patent No.: US 12,456,772 B2
(45) Date of Patent: Oct. 28, 2025

(54) BATTERY PACK

(71) Applicant: BLACK & DECKER INC., New Britain, CT (US)

(72) Inventors: Nathan J. Cruise, Phoenix, MD (US); Alexander R. Barton, Baltimore, MD (US); Ralphy A. Louis, York, PA (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 18/634,462

(22) Filed: Apr. 12, 2024

(65) Prior Publication Data

US 2024/0274944 A1  Aug. 15, 2024

Related U.S. Application Data

(60) Division of application No. 17/110,635, filed on Dec. 3, 2020, now Pat. No. 11,962,021, which is a
(Continued)

(51) Int. Cl.
*H01M 50/204* (2021.01)
*H01M 10/48* (2006.01)
*H01M 50/284* (2021.01)

(52) U.S. Cl.
CPC ....... *H01M 50/204* (2021.01); *H01M 10/482* (2013.01); *H01M 10/486* (2013.01); *H01M 50/284* (2021.01); *H01M 2200/105* (2013.01)

(58) Field of Classification Search
None
See application file for complete search history.

(56) References Cited

U.S. PATENT DOCUMENTS

2002/0070709 A1 6/2002 Small et al.
2007/0244471 A1* 10/2007 Malackowski ..... H02J 7/00047
606/1
(Continued)

FOREIGN PATENT DOCUMENTS

JP 2016072181 A 5/2016
KR 101642341 B1 7/2016

OTHER PUBLICATIONS

International Search Report and Written Opinion, PCT Application No. PCT/US2019/035775, Aug. 22, 2019, 9 pages, USPTO.
(Continued)

*Primary Examiner* — Wyatt P McConnell
(74) *Attorney, Agent, or Firm* — Michael Aronoff (57) ABSTRACT

The present invention is directed to a battery pack including improved fuse arrangement. The battery pack includes a plurality of battery cells, a battery cell holder holding the battery cells in a fixed position relative to each other, a printed circuit board attached to the battery cell holder and a busbar attached to the printed circuit board. The busbar may include a first leg extending away from the printed circuit board and a second leg extending away from the printed circuit board. The second leg is generally parallel to the first leg. The battery pack may further include a fuse. The fuse may include a first terminal connected to the first leg of the busbar and a second terminal connected to the second leg of the busbar such that the fuse is generally parallel to the printed circuit board.

4 Claims, 11 Drawing Sheets

Related U.S. Application Data continuation of application No. PCT/US2019/035775, filed on Jun. 6, 2019.

(60) Provisional application No. 62/681,390, filed on Jun. 6, 2018.

(56) References Cited

U.S. PATENT DOCUMENTS

| | | |
|---|---|---|
| 2011/0244276 A1 | 10/2011 | Takeshita et al. |
| 2017/0199084 A1 | 7/2017 | Kimura |
| 2018/0198172 A1* | 7/2018 | Choi .................. H01M 50/522 |

OTHER PUBLICATIONS

International Preliminary Report on Patentability, PCT Application No. PCT/US2019/035775, Dec. 8, 2020, 8 pages, USPTO.
Extended European Search Report, EP Application No. 19816168.9, Feb. 4, 2022, 6 pages, EPO.
Communication pursuant to Article 94(3) EPC, EP Application No. 19816168.9, Aug. 5, 2024, 4 pages, EPO.

* cited by examiner

BATTERY PACK

RELATED APPLICATIONS

This application is a divisional of U.S. patent application Ser. No. 17/110,635, filed Dec. 3, 2020, titled "Battery Pack," which is a continuation of and claims priority to PCT/US2019/035775, filed Jun. 6, 2019, titled "Battery Pack", which claims priority under 35 U.S.C. § 119(e) to U.S. Provisional Patent Application No. 62/681,390, filed Jun. 6, 2018, titled "Battery Pack".

TECHNICAL FIELD

This application relates to a battery pack and a method for manufacturing a battery pack. In one implementation, the battery pack includes a housing, a set of battery cells in the housing, and a temperature sensor for sensing the temperature of at least one of the battery cells.

BACKGROUND

Cordless power tools and other cordless devices utilize rechargeable battery cells. These battery cells are commonly placed in battery packs that are removably attachable to the tools or other devices. The battery cells may be repeatedly charged and discharged to allow a user to repeatedly use the tool without purchasing new battery cells.

It is important to monitor a temperature of the battery cells during charging and discharging to ensure that the temperature of the battery cells remains within a desired temperature range for safety purposes. It is particularly important to ensure that the battery cells do not over heat.

As such, the battery pack includes a temperature sensor to sense (monitor) the temperature of the battery cells. The temperature sensor is coupled to a switch or a controller to disable the battery pack if the temperature of the battery cells rises above an upper temperature threshold or falls below a lower temperature threshold. The temperature sensor may be placed on a printed circuit board (PCB). The PCB—and the sensor—is typically placed adjacent to the set of battery cells with the temperature sensor positioned near at least one of the cells.

As such, the temperature sensor can monitor the temperature of the battery cells during charging and discharging. As the temperature of the battery cells rises (or falls) the temperature sensor will react accordingly. Because the PCB upon which the temperature sensor is mounted can act like a heat sink, heat that is transferred from the battery cell to the temperature sensor may then be transferred to and dissipate throughout the PCB. As such, the readings of the temperature sensor may not truly represent the temperature of the battery cell. The temperature sensor may not reach an upper threshold indicative of the true temperature of the battery cell because some of the heat emitted from the battery cells will sink into the PCB. As such, the temperature of the temperature sensor may lag the temperature of the battery cell. In this instance the temperature sensor may not signal the switch or the controller to shut down the battery pack until after the battery cell temperature has exceeded the upper temperature threshold.

Figure 4:
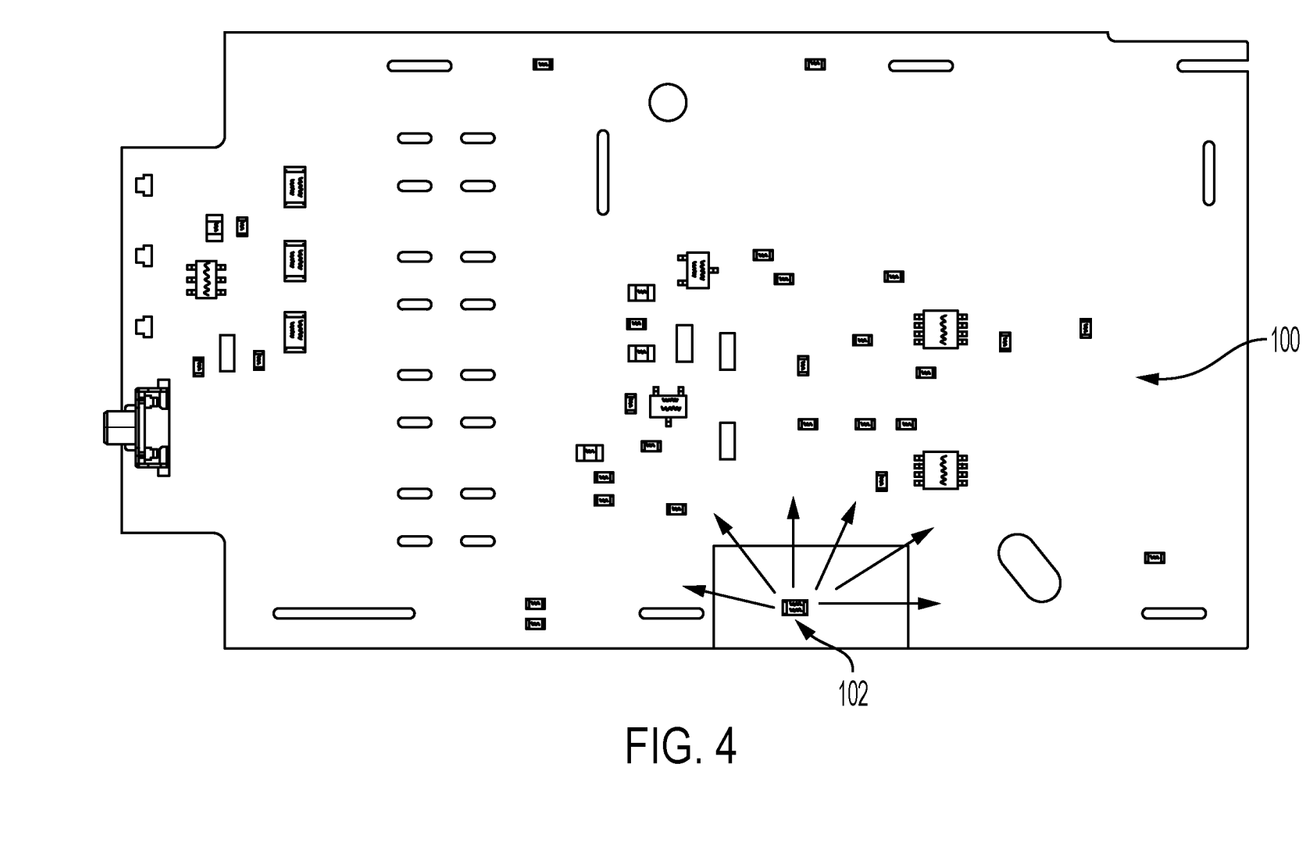
FIG. 4 is an underside view of a conventional printed circuit board of the battery subassembly of FIG. 2.

As illustrated in FIG. 4, a printed circuit board 100 including a variety of surface mounted components may be included in a battery pack. FIG. 4 illustrates an underside of a conventional PCB 100. This side is to be mounted adjacent to a plurality of battery cells. Included in the surface mounted components is a negative temperature coefficient (NTC) thermistor 102. The NTC thermistor 102 is an exemplary temperature sensor. When the PCB 100 is coupled to a battery cell holder 104 or to the battery cells, the NTC thermistor 102 is positioned relatively close to at least one of the battery cells. The NTC thermistor 102 is electrically coupled to a switch or a controller circuit that either includes a switch or controls a switch. As the temperature of the battery cells rises, the NTC thermistor 102 will respond accordingly. If the NTC thermistor senses that the temperature of the battery cells exceeds a predetermined threshold, a signal sent to the switch or to the control circuit will cause the switch or the control circuit to shut down the battery pack.

Figure 5:
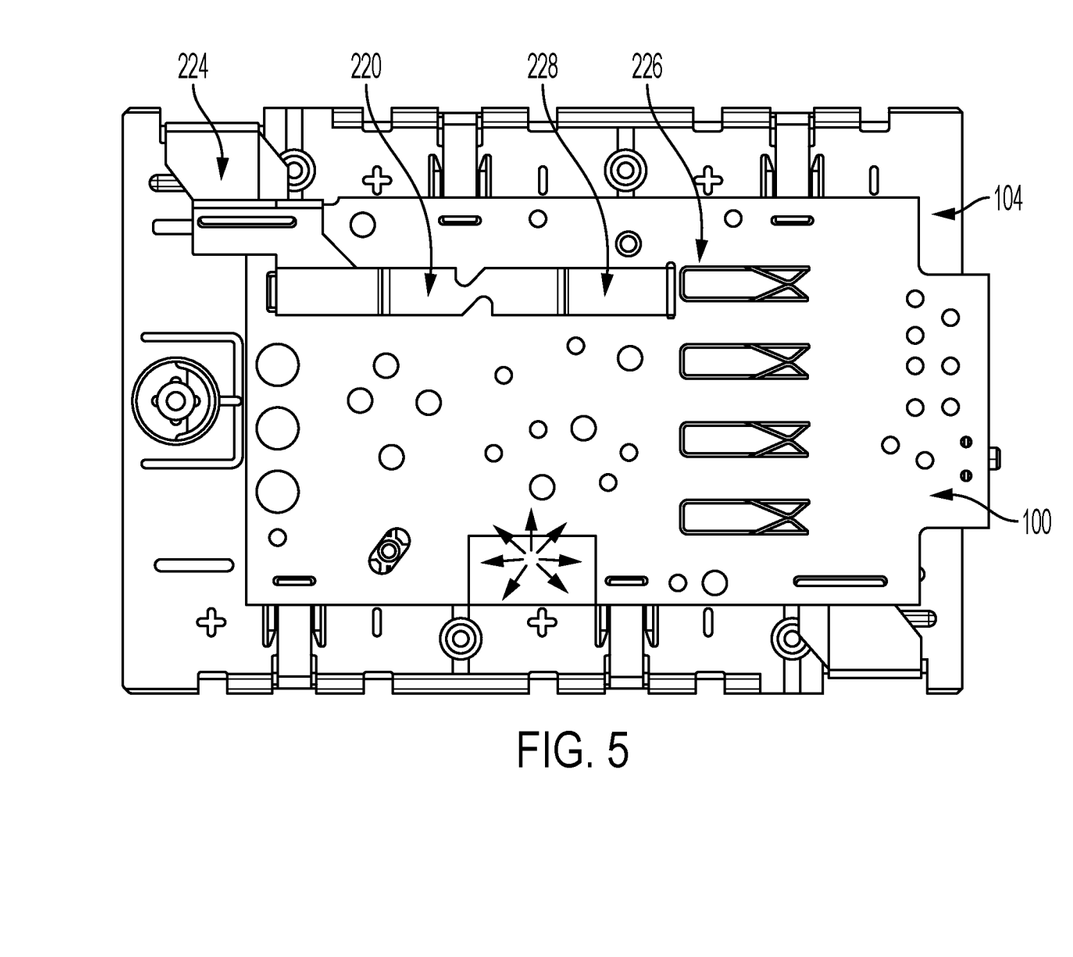
FIG. 5 is a top view of the battery subassembly of FIG. 2 including the conventional printed circuit board of FIG. 4.

Because the PCB 100 will sink some of the heat from the NTC thermistor 102 and the battery cells—as illustrated in FIGS. 4 and 5 by the heat distribution arrows—the NTC thermistor 102 may not accurately represent the temperature of the battery cells. As such, the NTC thermistor 102 may not send a shutdown signal to the switch or to the control circuit at the appropriate moment.

The present invention attempts to address this shortcoming of the conventional temperature sensor systems.

SUMMARY

An aspect of the present invention includes a printed circuit board, at least one component mounted to the printed circuit board, a cutout in the printed circuit board adjacent to the at least one component, the cutout configured to prevent heat about the at least one component from dissipating throughout the printed circuit board.

A battery pack, comprising a plurality of battery cells, a printed circuit board, a temperature sensor attached to the printed circuit board between the printed circuit board and at least one of the plurality of battery cells, and a cutout in the printed circuit board positioned to retain heat in the temperature sensor such that the temperature of the temperature sensor more closely tracks the temperature of the plurality of battery cells.

A battery pack, comprising a plurality of battery cells, a printed circuit board, a temperature sensor attached to the printed circuit board between the printed circuit board and at least one of the plurality of battery cells, and a cutout in the printed circuit board positioned adjacent to the temperature sensor to prevent heat from the temperature sensing from sinking to a portion of the printed circuit board on a side of the cutout opposed to the temperature sensor.

A battery pack, comprising a plurality of battery cells, a battery cell holder holding the plurality of battery cells in a fixed position relative to each other, the battery cell holder having an opening exposing a portion of at least one of the plurality of battery cells, a printed circuit board having a first side and a second side, the second side opposing the first side, the printed circuit board affixed to the battery cell holder such that the second side of the printed circuit board faces the battery cell holder, a thermistor attached to the second side of the printed circuit board, the thermistor received in the battery cell holder opening such that the thermistor is positioned between the printed circuit board and the exposed portion of the at least one of the plurality of battery cells and a cutout in the printed circuit board extending from the first side of the printed circuit board to the second side of the printed circuit board in a first direction and includes a first portion extending along a first side of the thermistor in a second direction, the second direction being generally perpendicular to the first direction.

Implementations of this aspect may include one or more of the following features.

Advantages may include one or more of the following.

These and other advantages and features will be apparent from the description and the drawings.

DETAILED DESCRIPTION

Figure 1:
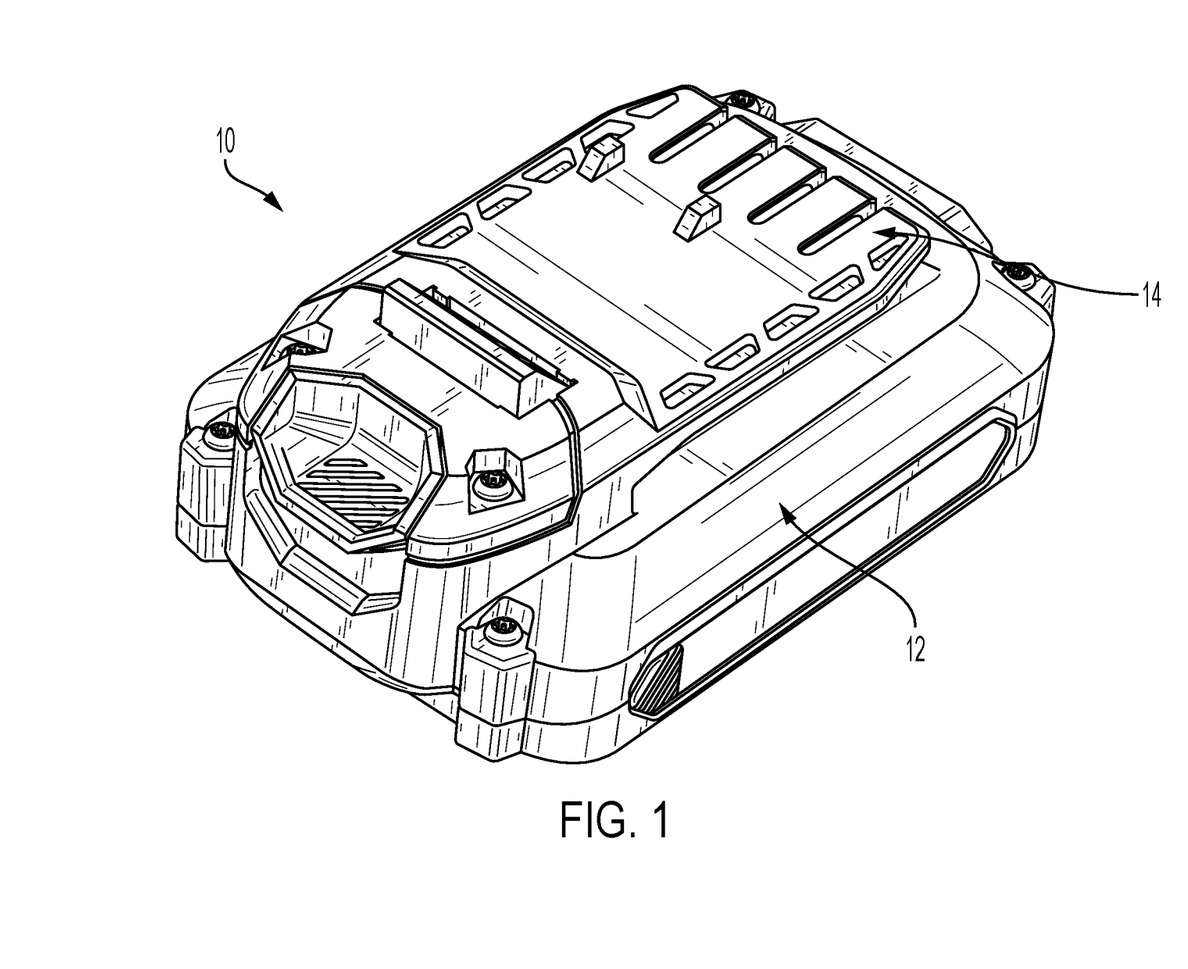
FIG. 1 is a perspective view of an exemplary battery pack of the present invention.

Referring to FIG. 1, there is illustrated an exemplary embodiment of a battery pack 10. The battery pack 10 may include a printed circuit board of the present invention. The battery pack includes a housing 12. The housing 12 includes an interface 14 for coupling the battery pack to a cordless power tool or other cordless devices.

Figure 2:
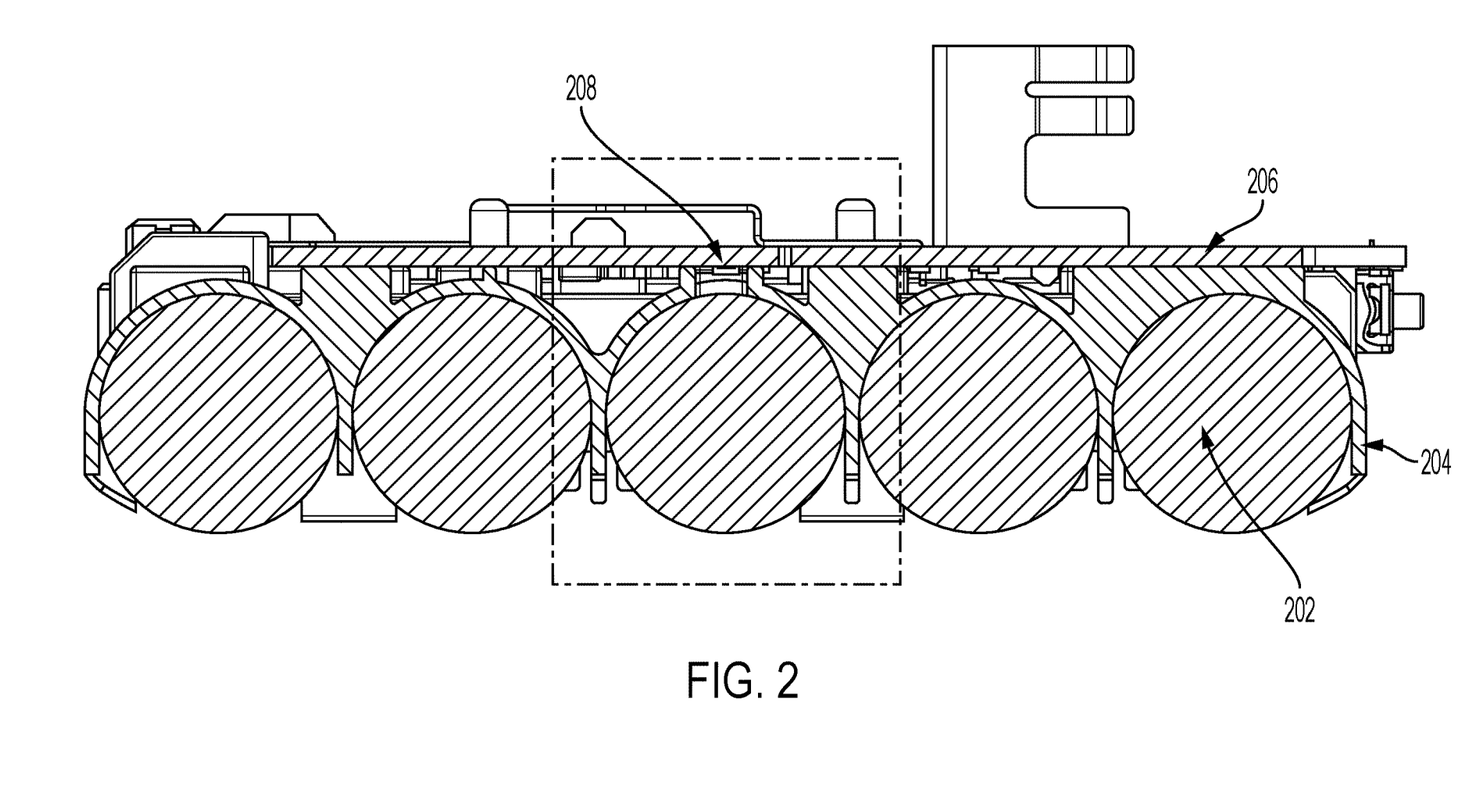
FIG. 2 is an elevation view of an exemplary battery subassembly of the battery pack of FIG. 1.
Figure 3:
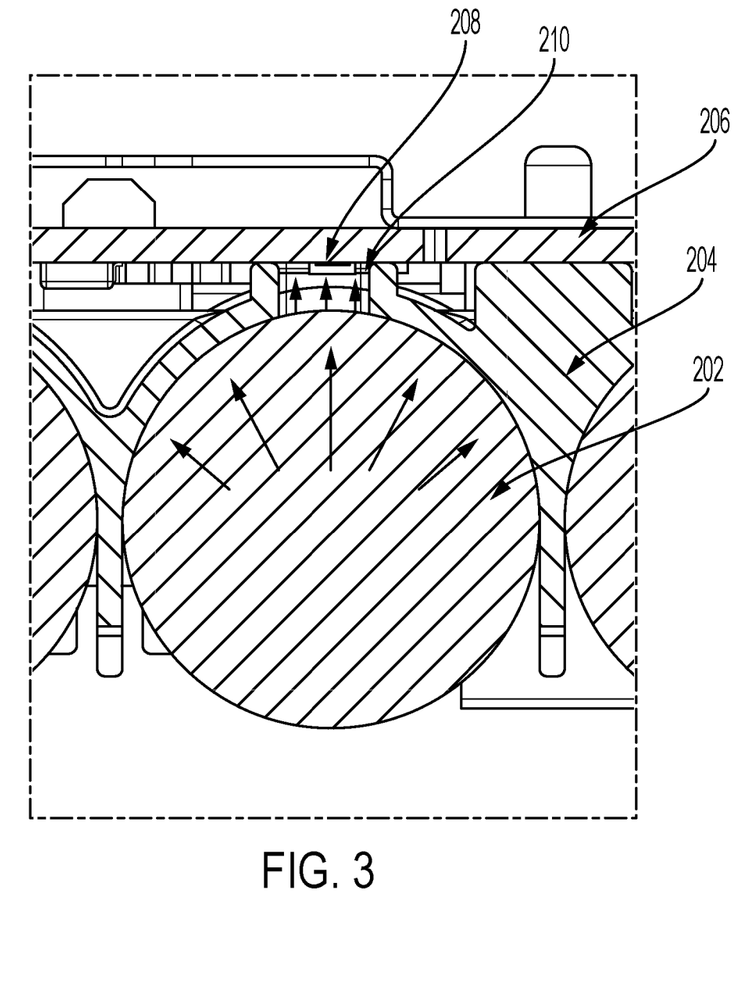
FIG. 3 is a detailed view of the battery subassembly of FIG. 2.

Referring also to FIG. 2, there is illustrated a battery pack subassembly 200 including a plurality of battery cells 202, a battery cell holder 204 to keep the battery cells fixedly positioned relative to each other, a printed circuit board 206, and a temperature sensor, such as a thermistor 208 positioned on an underside of the printed circuit board 206 and adjacent to one of the battery cells 202. FIG. 3 illustrates a more detailed view of a portion of the battery pack subassembly 200 of FIG. 2.

FIG. 3 illustrates a thermal path of heat generated by the battery cell 202. As the arrows indicate, heat generated by the battery cells 202 emanates outward from the battery cell 202. Some of the heat travels upwardly (in the perspective of FIG. 3) towards the printed circuit board 206 and the thermistor 208. The heat moves through an opening 210 in the battery cell holder 204 filled with a thermally conductive glue (not shown) and to the thermistor 208 on the underside of the printed circuit board 206.

As illustrated in FIGS. 4 and 5, in a conventional printed circuit board 100, as the thermistor 102 is not thermally isolated from a majority of the printed circuit board 100 the heat from the thermistor 102 is dissipated (or sunk) into the printed circuit board 100 (as illustrated by the arrows). As such, the temperature of the thermistor 102 will lag (be much less than) the temperature of the battery cell. As such, the monitoring system of the battery pack may be prevented from responding to the battery cell temperature exceeding a critical temperature threshold.

Figure 6:
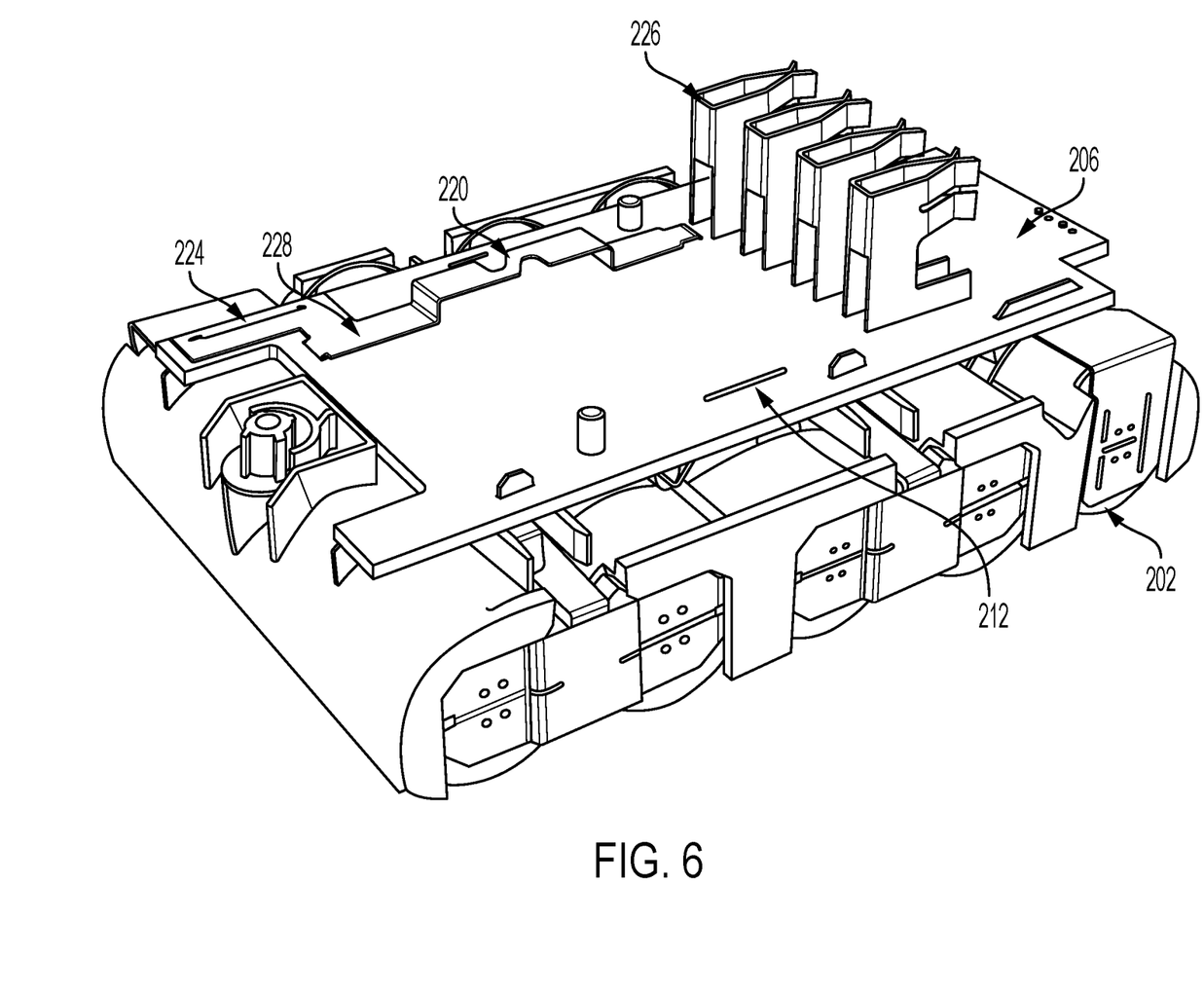
FIG. 6 is a top perspective view of an exemplary battery subassembly including an exemplary printed circuit board of the present invention.
Figure 7:
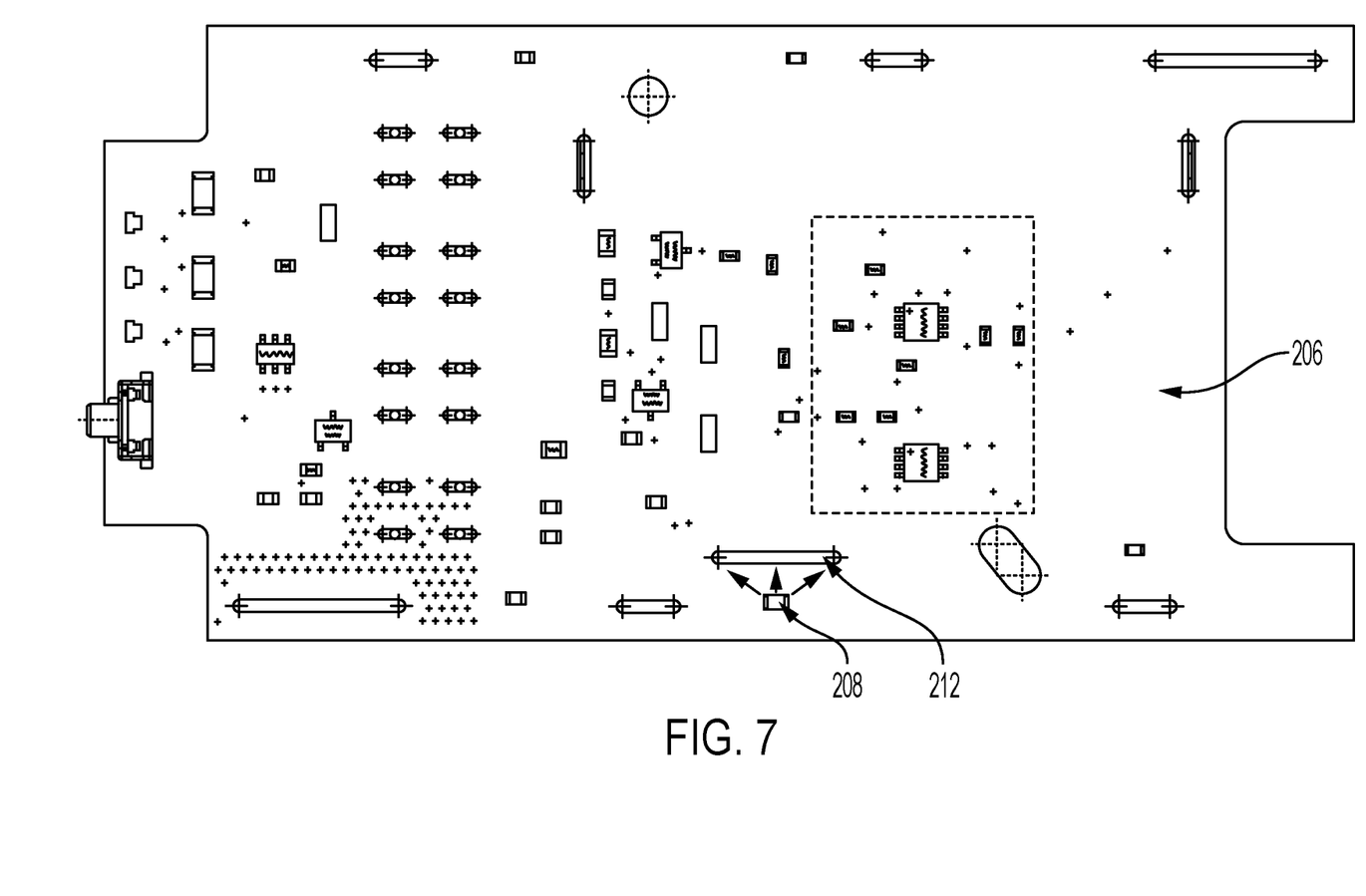
FIG. 7 is an underside view of the exemplary printed circuit board of FIG. 6.

As illustrated in FIGS. 6 and 7, an aspect of the present invention provides a cutout 212 in the printed circuit board 206 adjacent to the thermistor 208 between the thermistor 208 and the majority of the printed circuit board 206. As illustrated by the heat transfer arrows, heat is prevented from sinking to a majority of the printed circuit board 206. As such, more heat will be retained by the thermistor 208 than if the cutout 212 was not present. This in turn will keep the temperature of the thermistor 208 closer to the temperature of the battery cell 202 that the thermistor 208 is monitoring.

Figure 8:
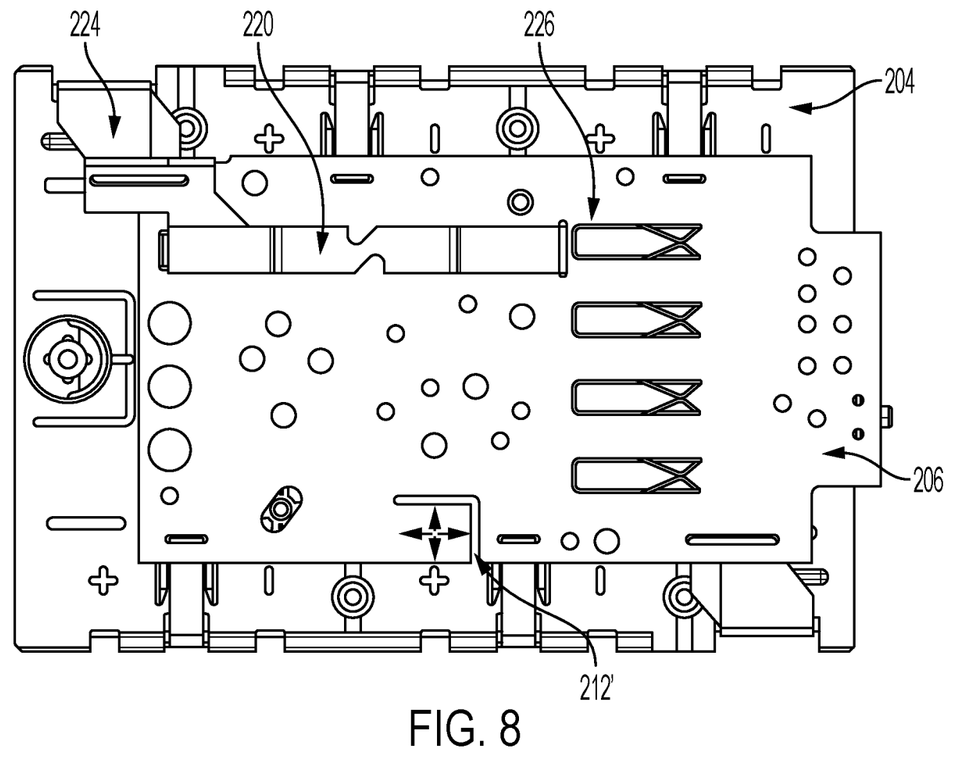
FIG. 8 is a top view of another exemplary battery subassembly including another exemplary printed circuit board of the present invention.
Figure 9:
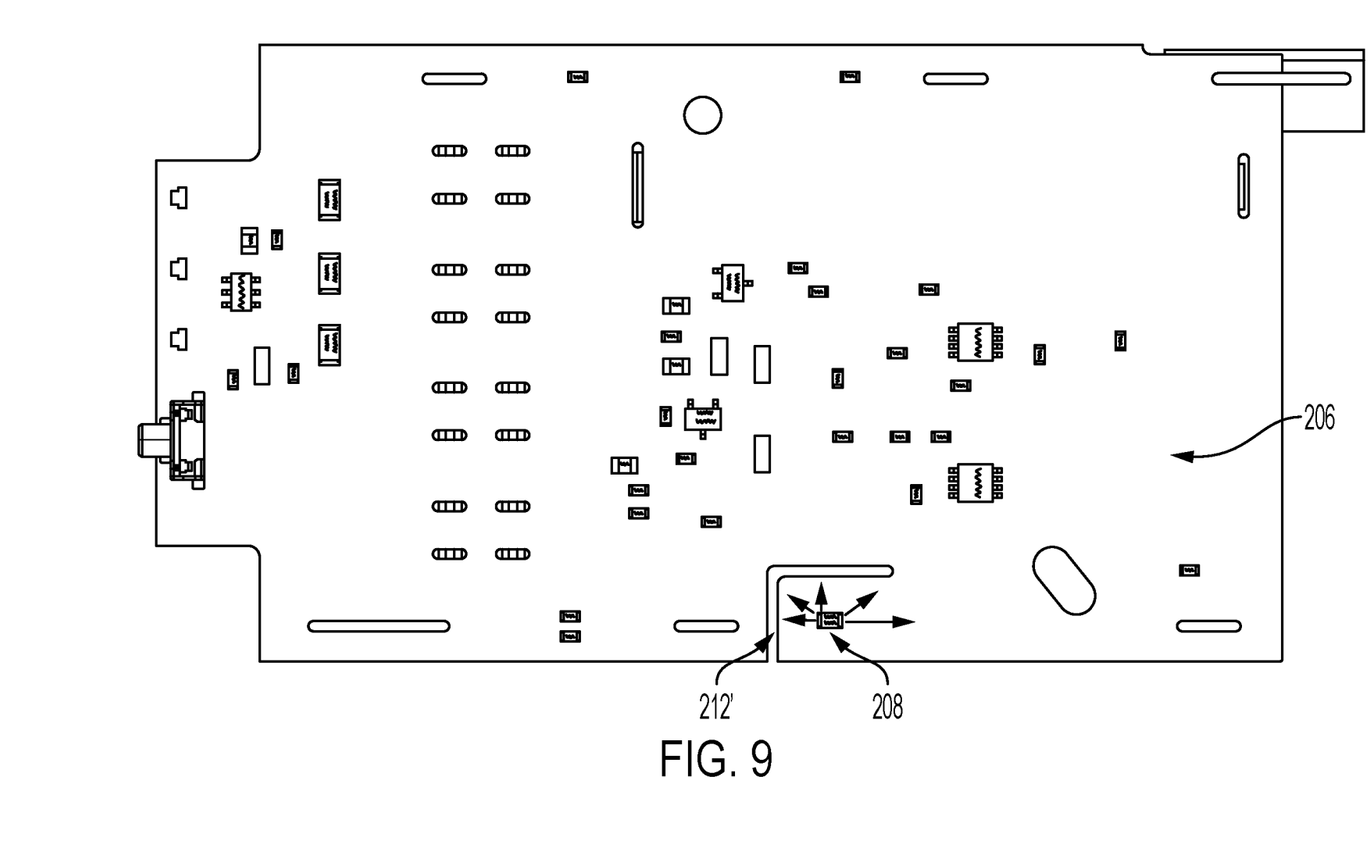
FIG. 9 is an underside view of the exemplary printed circuit board of FIG. 8.
Figure 10:
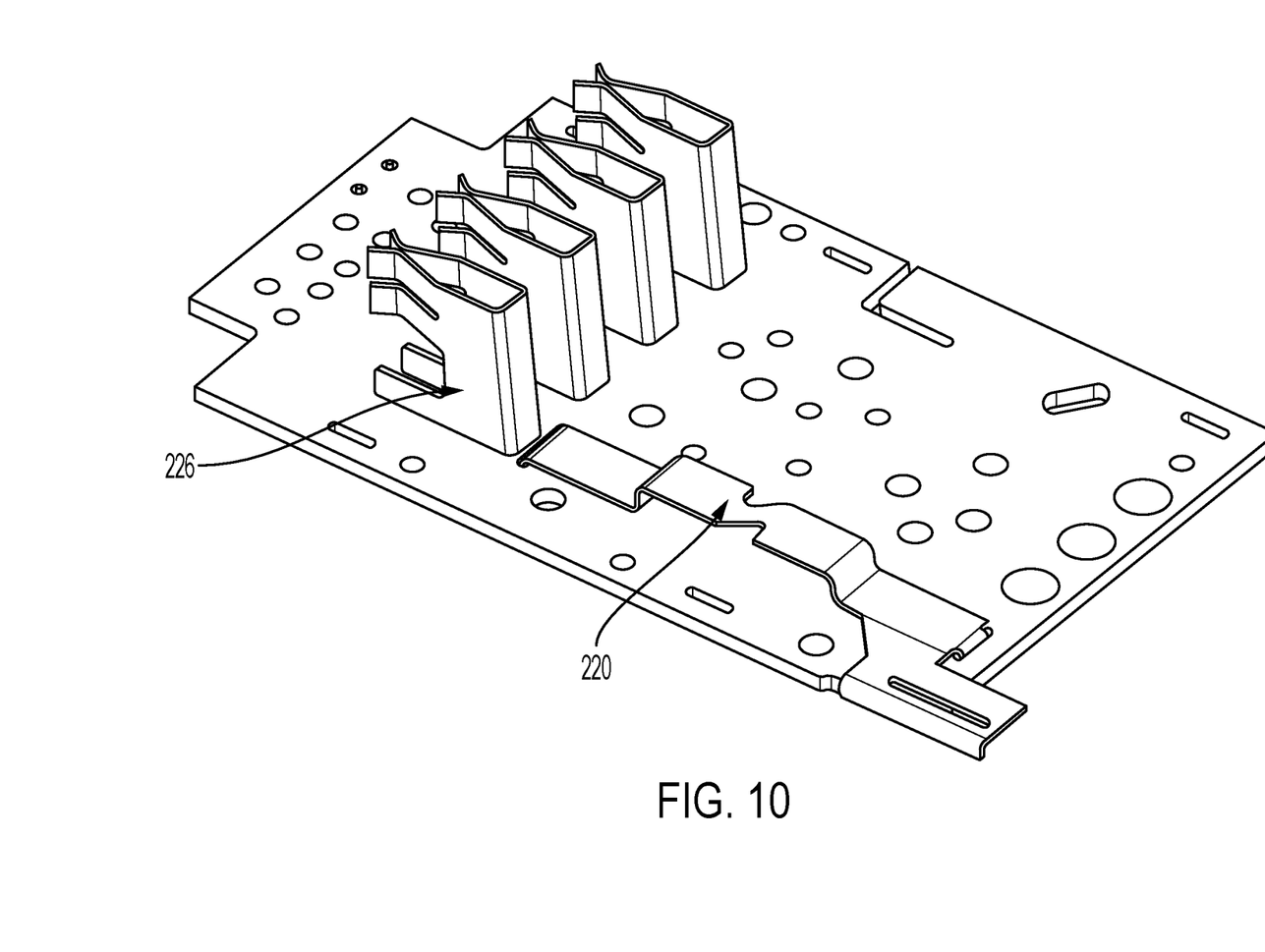
FIG. 10 is a topside isometric view of the example printed circuit board of FIG. 8.
Figure 11:
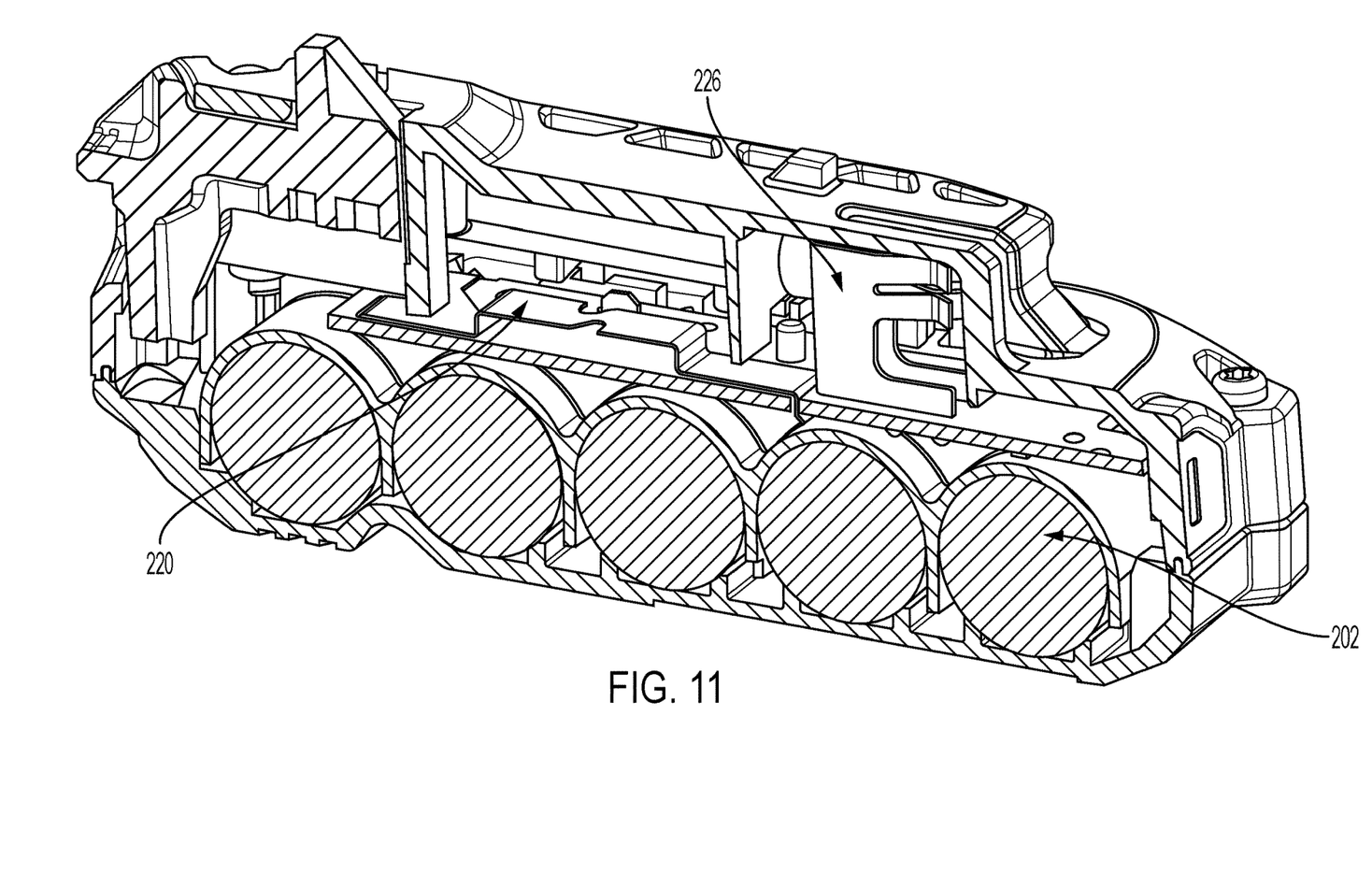
FIG. 11 is a section view of the example battery pack of FIG. 1 with the example battery subassembly of FIG. 8.

FIGS. 8 and 9 illustrate an alternate embodiment of the printed circuit board cutout 212'. In this embodiment, the cutout in the printed circuit board is adjacent to two sides of the thermistor 208. This configuration will prevent even more heat from dissipating into the printed circuit board 206 and keep the temperature of the thermistor 208 even closer to the temperature of the battery cell 202 that the thermistor 208 is monitoring. In other words, using the cutout 212' will allow the thermistor 208 to more closely follow the temperature of the battery cell 202. This will allow the switch or control circuit to respond to more accurate battery cell temperatures.

FIGS. 5, 6, 8, 10 and 11 illustrate another aspect of the present invention. This aspect is directed to a fuse 220 attached to the printed circuit board 206. The fuse 220 couples a terminal (or a weld strap 224 associated with a terminal) of a battery cell 202 and a power terminal 226. For example, the fuse 220 may connect the negative terminal of the most negative battery cell in a string of battery cells and a negative power terminal of the battery pack. Conventional fuses are typically placed on a side (or shoulder) of the battery pack subassembly, between a battery cell terminal and the printed circuit board. However, with the fuse at the shoulder it is possible for plastic of the battery pack housing or cell holder to melt during high current discharge.

The fuse 220 is incorporated into a bus bar 228 that is attached to the printed circuit board 206. The bus bar 228 includes two legs that extend away from the printed circuit board 206. The fuse 220 is positioned between the legs. This allows the fuse 220 to be distanced (or separated) from the printed circuit board 206. This prevents melting of the printed circuit board 206 during high current discharge. The fuse 220 is also positioned at a point where there are minimal components attached to the printed circuit board 206. The bus bar 228/fuse 220 is wave soldered to the printed circuit board 206 which couples the bus bar 228/fuse 220 to the power terminal 226. The printed circuit board 206 is then coupled to the battery cell holder 204 and the bus bar 228/fuse 220 is welded to the battery cell terminal (weld strap 224).

Numerous modifications may be made to the exemplary implementations described above. These and other implementations are within the scope of this application.

The invention claimed is:

1. A battery pack, comprising:
   a plurality of battery cells;
   a battery cell holder holding the plurality of battery cells in a fixed position relative to each other, the battery cell holder having an opening exposing a portion of at least one of the plurality of battery cells;
   a printed circuit board having a first side, a second side, a central portion and a perimeter edge, the second side opposing the first side, the printed circuit board affixed to the battery cell holder such that the second side of the printed circuit board faces the battery cell holder;

a thermistor attached to the second side of the printed circuit board adjacent to the perimeter edge, the thermistor received in the battery cell holder opening such that the thermistor is positioned between the printed circuit board and the exposed portion of the at least one of the plurality of battery cells, the temperature sensor having a first dimension along a first axis; and a cutout in the printed circuit board extending from the first side of the printed circuit board to the second side of the printed circuit board in a first direction and includes a first portion extending along a first side of the thermistor in a second direction, the second direction being generally perpendicular to the first direction, the first portion between the temperature sensor and the central portion, the first portion having a first dimension along the first axis, the first dimension of the cutout being at least two times the first dimension of the temperature sensor and the first dimension of the temperature sensor being centrally positioned relative to the first dimension of the cutout along the first axis, wherein the cutout is positioned to retain heat in the thermistor such that the temperature of the thermistor more closely tracks the temperature of the plurality of battery cells.

2. The battery pack, as recited in claim 1, wherein the cutout includes a second portion extending along a second side of the thermistor in a third direction, the third direction being generally perpendicular to the first direction and the second direction.

3. The battery pack, as recited in claim 2, wherein the first portion of the cutout and the second portion of the cutout form an L-shaped cutout about two adjacent sides of the thermistor.

4. The battery pack, as recited in claim 1, wherein the cutout prevents heat from the temperature sensing from sinking to a portion of the printed circuit board on a side of the cutout opposed to the thermistor.

\* \* \* \* \*